United States Patent
Yang

(10) Patent No.: US 12,089,186 B2
(45) Date of Patent: Sep. 10, 2024

(54) RESOURCE DETERMINATION METHOD AND DEVICE

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 419 days.

(21) Appl. No.: 17/310,599

(22) PCT Filed: Feb. 14, 2019

(86) PCT No.: PCT/CN2019/075080
§ 371 (c)(1),
(2) Date: Aug. 12, 2021

(87) PCT Pub. No.: WO2020/164052
PCT Pub. Date: Aug. 20, 2020

(65) Prior Publication Data
US 2022/0110093 A1    Apr. 7, 2022

(51) Int. Cl.
*H04W 72/02*     (2009.01)
*H04W 72/0446*    (2023.01)
(Continued)

(52) U.S. Cl.
CPC ....... *H04W 72/02* (2013.01); *H04W 72/0446* (2013.01); *H04W 72/20* (2023.01); *H04W 72/542* (2023.01)

(58) Field of Classification Search
CPC ... H04W 72/02; H04W 72/20; H04W 72/542; H04W 72/0446
See application file for complete search history.

(56) References Cited

U.S. PATENT DOCUMENTS

2016/0381666 A1   12/2016   Kim et al.
2017/0303240 A1   10/2017   Basu Mallick et al.
(Continued)

FOREIGN PATENT DOCUMENTS

CN     106063352 A    10/2016
CN     107211470 A    9/2017
(Continued)

OTHER PUBLICATIONS

International Search Report of PCT Application No. PCT/CN2019/075080 mailed Oct. 31, 2019.
(Continued)

*Primary Examiner* — Kevin M Cunningham
(74) *Attorney, Agent, or Firm* — Syncoda LLC; Feng Ma

(57) ABSTRACT

A resource determination method includes: according to first sending resource pool configuration information that is obtained in advance, sending a first sending resource, wherein the first sending resource pool configuration information is used to characterize a sending resource pool sending a direct link control signaling, and the first sending resource is used for a first user equipment to send a first direct link control signaling to a second user equipment on a direct link; and sending the first direct link control signaling to the second user equipment by using the first sending resource. With the present technical solution, transmission resources are allocated to the direct link control signaling, so that the UE may send the direct link control signaling on the direct link, thereby effectively managing unicast connection, improving the performance of direct connection communication, and improving system reliability.

16 Claims, 7 Drawing Sheets

(51) Int. Cl.
*H04W 72/20* (2023.01)
*H04W 72/542* (2023.01)

(56) References Cited

U.S. PATENT DOCUMENTS

| | | | | |
|---|---|---|---|---|
| 2020/0178256 | A1* | 6/2020 | Tang | H04W 72/0453 |
| 2020/0205166 | A1* | 6/2020 | Huang | H04W 76/27 |
| 2021/0298044 | A1* | 9/2021 | Cheng | H04W 72/02 |
| 2022/0086805 | A1* | 3/2022 | Zhang | H04W 72/23 |

FOREIGN PATENT DOCUMENTS

| | | | |
|---|---|---|---|
| CN | 107534828 | A | 1/2018 |
| CN | 108029115 | A | 5/2018 |
| CN | 108923894 | A | 11/2018 |
| CN | 109076561 | A1 | 12/2018 |
| CN | 109327906 | A | 2/2019 |
| EP | 3122126 | A1 | 1/2017 |
| WO | 2006136069 | A1 | 12/2006 |
| WO | 2016176965 | A1 | 11/2016 |
| WO | 2017136001 | A | 8/2017 |

OTHER PUBLICATIONS

ZTE, Sanechips; Overall consideration on NR V2X resource allocation (R2-1816981); 3GPP TSG-RAN WG2#104 Spokane, USA, Nov. 12-16, 2018.
India 1st Office Action in Application No. 202127040782, mailed on Aug. 4, 2022.
Extended European Search Report in Application No. 19915241.4, mailed on Aug. 1, 2022.
CN Notice of Allowance in Application No. 201980000169.8, mailed on Mar. 31, 2023.
3GPP TSG-RAN WG2 Meeting #95 Gothenburg, Sweden, Aug. 22-26, 2016, R2-165780, Introducing V2V to TS 36.331, Huawei, HiSilicon.
3GPP TSG-RAN2#89 meeting, Athens, Greece, Feb. 9-13, 2015, R2-150716, Introducing of ProSe, Samsung.
Liu Qiang, Yuan Wangang: Journal of Beijing Jiaotong University vol. 42 No. 2, Apr. 2018, Research on a media access control protocol of cluster-based MANET.

* cited by examiner

RESOURCE DETERMINATION METHOD AND DEVICE

CROSS-REFERENCE TO RELATED APPLICATION

This application is a national stage of International Application No. PCT/CN2019/075080 filed on Feb. 14, 2019, the disclosure of which is hereby incorporated by reference in its entirety.

TECHNICAL FIELD

The present disclosure relates to the field of communication technologies, and in particular to a resource determination method and device.

BACKGROUND

Communication between user equipment (UE) can be relayed through a base station of a cellular network and a core network. That is, a communication link between the UE and the base station in the cellular network is used for the communication. Alternatively, a sidelink (SL) between UEs can also be used for sidelink communication. The sidelink communication can effectively utilize deployed base stations and reduce equipment overhead.

A sidelink unicast connection is introduced in the 5G mobile communication network, and it is required to manage the unicast connection by sending a sidelink control signaling on the sidelink. However, how to allocate a sending resource for the sidelink control signaling is a problem that needs to be solved.

SUMMARY

Embodiments of the present disclosure provide a resource determination method and device. The technical solution is as follows.

According to a first aspect of embodiments of the present disclosure, there is provided a resource determination method. The method includes:

determining a first sending resource according to first sending resource pool configuration information obtained in advance, wherein the first sending resource pool configuration information is used for indicating a sending resource pool for sending a sidelink control signaling, and the first sending resource is used by a first user equipment to send a first sidelink control signaling to a second user equipment on a sidelink; and sending the first sidelink control signaling to the second user equipment by using the first sending resource.

The technical solution provided by embodiments of the present disclosure may include the following beneficial effects. In the technical solution, the first sending resource, for use by the first user equipment for sending the first sidelink control signaling to the second user equipment on the sidelink, is determined based on the first sending resource pool configuration information. The first sending resource pool configuration information is obtained in advance and used for indicating the sending resource pool for sending the sidelink control signaling. Thus, the sending resource is allocated for the sidelink control signaling, so that the UE may send the sidelink control signaling on the sidelink, thereby effectively managing unicast connection, improving the performance of sidelink communication, and improving system reliability.

In an embodiment, the method further includes:
receiving a broadcast message which is sent by a base station and includes the first sending resource pool configuration information.

In an embodiment, the method further includes:
determining the first sending resource pool configuration information according to second sending resource pool configuration information obtained in advance, wherein the second sending resource pool configuration information is used for indicating a sending resource pool for sending sidelink data.

In an embodiment, the determining the first sending resource pool configuration information, according to the second sending resource pool configuration information obtained in advance, includes:
selecting the first sending resource from the sending resource pool for sending the sidelink data, according to quality of service (QoS) corresponding to the sending resource pool which is used for sending the sidelink data and indicated by the second sending resource pool configuration information.

In an embodiment, the method further includes:
determining a first time domain resource position where the sidelink control signaling and the sidelink data are unable to be received by the first user equipment, according to a sending resource which is to be occupied by the sidelink data and the air interface data to be sent by the first user equipment.

Accordingly, the first sidelink control signaling includes first indication information, wherein the first indication information is used for indicating the first time domain resource position, for instructing the second user equipment not to send the sidelink control signaling and the sidelink data to the first user equipment at the first time domain resource position.

In an embodiment, the method further includes: before determining the first sending resource according to the first sending resource pool configuration information obtained in advance, receiving a second sidelink control signaling sent by the second user equipment, wherein the second sidelink control signaling includes second indication information, and the second indication information is used for indicating a second time domain resource position where the sidelink control signaling and the sidelink data are unable to be received by the second user equipment.

Accordingly, the determining the first sending resource according to the first sending resource pool configuration information obtained in advance includes:
determining the first sending resource according to the second time domain resource position, and the first sending resource pool configuration information obtained in advance, wherein the first sending resource does not include the second time domain resource position.

In an embodiment, the first sidelink control signaling includes any of the following signaling:
a sidelink connection request, a sidelink connection establishment, a sidelink connection establishment completion, a sidelink reconfiguration, and a sidelink release.

According to a second aspect of embodiments of the present disclosure, there is provided a resource determination device. The device includes:
a first determining module, configured to determine a first sending resource according to first sending resource pool configuration information obtained in advance, wherein the first sending resource pool configuration information is used for indicating a sending resource pool for sending a sidelink control signaling, and the first sending resource is used by a first user equipment to send a first sidelink control signaling to a second user equipment on a sidelink; and a sending module, configured to send the first sidelink control signaling to the second user equipment by using the first sending resource.

In an embodiment, the device further includes:

a first receiving module, configured to receive a broadcast message which is sent by a base station and includes the first sending resource pool configuration information.

In an embodiment, the device further includes:

a second determining module, configured to determine the first sending resource pool configuration information according to second sending resource pool configuration information obtained in advance, wherein the second sending resource pool configuration information is used for indicating a sending resource pool for sending sidelink data.

In an embodiment, the second determining module is configured to select the first sending resource from the sending resource pool for sending the sidelink data, according to quality of service (QoS) corresponding to the sending resource pool which is used for sending the sidelink data and indicated by the second sending resource pool configuration information.

In an embodiment, the device further includes:

a third determining module, configured to determine a first time domain resource position where the sidelink control signaling and the sidelink data are unable to be received by the first user equipment, according to a sending resource which is to be occupied by the sidelink data and air interface data to be sent by the first user equipment. Accordingly, the first sidelink control signaling includes first indication information, wherein the first indication information is used for indicating the first time domain resource position, for instructing the second user equipment not to send the sidelink control signaling and the sidelink data to the first user equipment at the first time domain resource position.

In an embodiment, the device further includes:

a second receiving module, configured to receive a second sidelink control signaling sent by the second user equipment, wherein the second sidelink control signaling includes second indication information, and the second indication information is used for indicating a second time domain resource position where the sidelink control signaling and the sidelink data are unable to be received by the second user equipment.

Accordingly, the first determining module is configured to determine the first sending resource according to the second time domain resource position, and the first sending resource pool configuration information obtained in advance, wherein the first sending resource does not include the second time domain resource position.

According to a third aspect of embodiments of the present disclosure, there is provided a resource determination device, and the device includes:

a processor; and a memory for storing executable instructions of the processor, wherein the processor is configured to:

determine a first sending resource according to first sending resource pool configuration information obtained in advance, wherein the first sending resource pool configuration information is used for indicating a sending resource pool for sending a sidelink control signaling, and the first sending resource is used by a first user equipment to send a first sidelink control signaling to a second user equipment on a sidelink; and send the first sidelink control signaling to the second user equipment by using the first sending resource.

According to a fourth aspect of embodiments of the present disclosure, there is provided a computer-readable storage medium having at least one instruction stored thereon, wherein the instruction is loaded and executed by a processor to implement operations executed in the method described in the first aspect.

It should be noted that the above general description and the following detailed description are merely exemplary and explanatory and should not be construed as limiting of the present disclosure.

BRIEF DESCRIPTION OF THE DRAWINGS

The accompanying drawings, which are incorporated in and constitute a part of the present specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the related art, since UE may not send a control signaling on a sidelink within network coverage of the 4G mobile communication network, a base station may only allocate a sending resource for sidelink data, but cannot allocate a sending resource for a sidelink control signaling. This causes that the UE cannot send the sidelink control signaling on the sidelink based on the related art, and thus cannot manage a unicast connection, thereby affecting performance of sidelink communication and reducing system reliability.

In order to solve the above problems, embodiments of the present disclosure provide a resource determination method. The method includes: determining a first sending resource according to first sending resource pool configuration information obtained in advance, wherein the first sending resource pool configuration information is used for indicating a sending resource pool for sending a sidelink control signaling, and the first sending resource is used by a first user equipment to send a first sidelink control signaling to a second user equipment on a sidelink; and sending the first sidelink control signaling to the second user equipment by using the first sending resource. In the resource determination method provided by embodiments of the present disclosure, the first sending resource, for sending by the first user equipment the first sidelink control signaling to the second user equipment on the sidelink, is determined based on the first sending resource pool configuration information. The first sending resource pool configuration information is obtained in advance and is used for indicating the sending resource pool for sending the sidelink control signaling. Thus, the sending resource is allocated for the sidelink control signaling, so that the UE may send the sidelink control signaling on the sidelink, thereby effectively managing unicast connection, improving the performance of sidelink communication, and improving system reliability.

Figure 1:
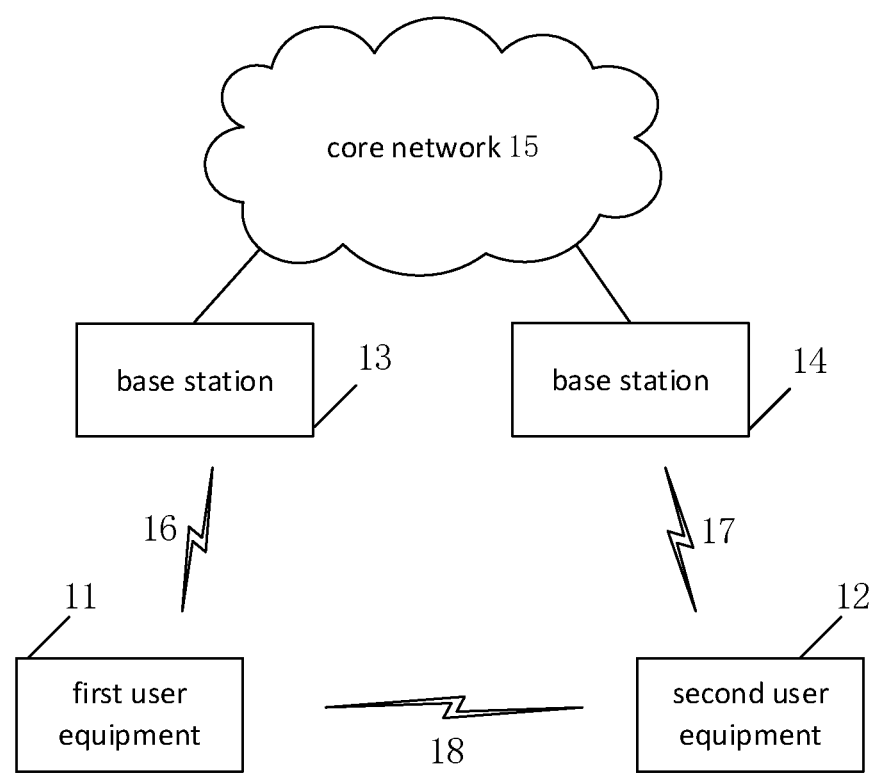
FIG. 1 is an application scenario diagram of a resource determination method according to an exemplary embodiment.

Referring to an optional application scenario of the resource determination method in embodiments of the present disclosure shown in FIG. 1, the application scenario shown in FIG. 1 involves: a first user equipment 11, a second user equipment 12, a base station 13 of a cellular network, a base station 14, and a core network 15. The cellular network may be a 4G or 5G network, etc. The first user equipment 11 communicates with the base station 13 through an air interface 16, and the second user equipment 12 communicates with the base station 14 through an air interface 17. The communication between the first user equipment 11 and the second user equipment 12 can be relayed through the base station 13, the base station 14 and the core network 15. Alternatively, the first user equipment 11 and the second user equipment 12 can perform sidelink communication through a sidelink 18 between them. The application scenario shown in FIG. 1 is only an example of a possible application scenario for the technical solution in embodiments of the present disclosure. Other application scenarios may include devices and networks not involved in FIG. 1. It should be noted that in an actual application scenarios, the above-mentioned first user equipment 11 and second user equipment 12 may also access the same base station.

It should be pointed out that the resource determination method provided by embodiments of the present disclosure can be applied to technologies supporting sidelink communication, such as V2X technologies. The first user equipment and the second user equipment involved in embodiments of the present disclosure may include, for example, vehicle-mounted devices, handheld devices, and roadside devices that support V2X sidelink communication. The handheld devices may include, for example, smart phones, tablet computers, desktop computers, laptops, drones or wearable devices (such as bracelets, smart glasses, etc.), etc.

Based on the above analysis, the following specific embodiments are proposed.

Figure 2:
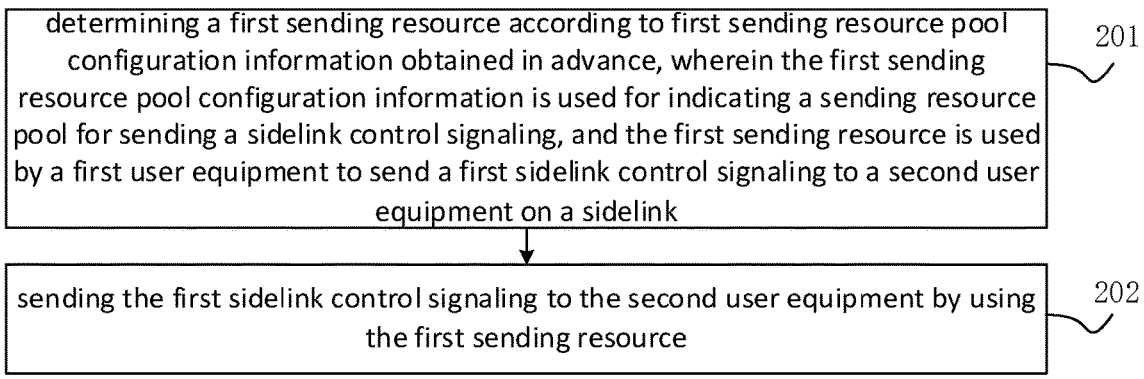
FIG. 2 is a flowchart showing a resource determination method according to an exemplary embodiment.

FIG. 2 is a flowchart showing a resource determination method according to an exemplary embodiment. An execution subject of the resource determination method in embodiments of the present disclosure may be the first user equipment. The first user equipment and the second user equipment 12 may perform the sidelink communication through the sidelink, and a unicast connection is established between the first user equipment and the second user equipment. As shown in FIG. 2, the method includes the following steps 201-202.

In the step 201, a first sending resource is determined according to first sending resource pool configuration information obtained in advance, wherein the first sending resource pool configuration information is used for indicating a sending resource pool for sending a sidelink control signaling, and the first sending resource is used by a first user equipment to send a first sidelink control signaling to a second user equipment on a sidelink.

In some embodiments, the first sidelink control signaling may include any of the following signaling: a sidelink connection request message, a sidelink connection establishment message, a sidelink connection establishment completion message, a sidelink reconfiguration message, and a sidelink release message. There may be one or more sending resource pools for sending the sidelink control signaling.

In some embodiments, implementations for obtaining by the first user equipment the first sending resource pool configuration information may include any one of the following or combinations.

According to a first implementation, the first user equipment receives a broadcast message, which broadcast message is sent by the base station and includes the first sending resource pool configuration information.

In some embodiments, the base station may carry the first sending resource pool configuration information in the broadcast message such as SIB18, SIB19, SIB21, or SIB26 as broadcast, and the UE in an idle state may read the broadcast message to obtain the sending resource pool for sending the sidelink control signaling. The sending resource pools for different application scenarios such as V2X, V2P, or V2I can be configured independently. The first user equipment determines the first sending resource by itself from the sending resource pool which is used for transmitting the sidelink control signaling and indicated by the first sending resource pool configuration information.

According to a second implementation, the first sending resource pool configuration information is preconfigured in the first user equipment.

According to a third implementation, the first user equipment determines the first sending resource pool configuration information according to second sending resource pool configuration information obtained in advance. The second sending resource pool configuration information is used for indicating the sending resource pool for sending the sidelink data. There may be one or more sending resource pools for sending the sidelink data. Optionally, the sending resource pool for sending the sidelink control signaling is selected from the sending resource pools for sending the sidelink data, according to quality of service (QoS) corresponding to the sending resource pool which is used for sending the sidelink data and indicated by the second sending resource pool configuration information. Then, the first sending resource is selected from the sending resource pool for sending the sidelink control signaling. QoS can include priority, time delay, bit error rate, etc. of the sidelink data. For example, a sending resource pool corresponding to the sidelink data with the highest priority in the sending resource pools for sending the sidelink data is determined as the sending resource pool for sending the sidelink control signaling.

In the step 202, the first sidelink control signaling is sent to the second user equipment by using the first sending resource.

In some embodiments, after determining the first sending resource, the first user equipment uses the first sending resource to send the first sidelink control signaling to the second user equipment. Thus, effective management of the unicast connection between the first user equipment and the second user equipment is achieved.

Through the technical solution provided by embodiments of the present disclosure, the first sending resource, for sending by the first user equipment the first sidelink control signaling to the second user equipment on the sidelink, is determined based on the first sending resource pool configuration information which is obtained in advance and used for indicating the sending resource pool for sending the sidelink control signaling. Thus, the sending resource is allocated for the sidelink control signaling, so that the UE may send the sidelink control signaling on the sidelink, thereby effectively managing unicast connection, improving the performance of sidelink communication, and improving system reliability.

Figure 3:
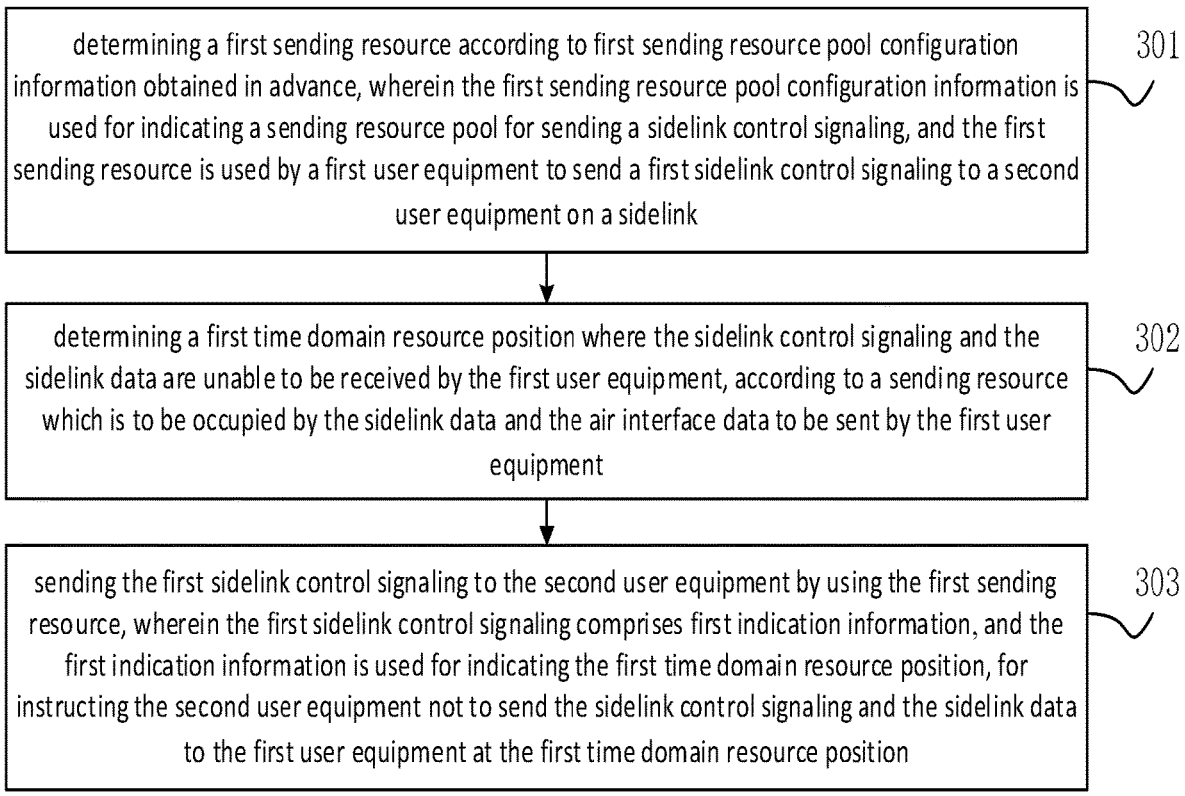
FIG. 3 is a flowchart showing a resource determination method according to an exemplary embodiment.

FIG. 3 is a flowchart showing a resource determination method according to an exemplary embodiment. The execution subject of the resource determination method in embodiments of the present disclosure may be the first user equipment. As shown in FIG. 3, the method includes the following steps 301-303. For parts not described in detail in this embodiment, reference may be made to the corresponding description of the embodiment shown in FIG. 2.

In the step 301, a first sending resource is determined according to first sending resource pool configuration information obtained in advance, wherein the first sending resource pool configuration information is used for indicating a sending resource pool for sending a sidelink control signaling, and the first sending resource is used by a first user equipment to send a first sidelink control signaling to a second user equipment on a sidelink.

In the step 302, a first time domain resource position where the sidelink control signaling and the sidelink data are unable to be received by the first user equipment is determined, according to a sending resource which is to be occupied by the sidelink data and air interface data to be sent by the first user equipment.

In some embodiments, the sending resource, which is to be occupied by the sidelink data and the air interface data to be sent by the first user equipment, may be sidelink data and air interface data which are to be sent and predicted according to a sending pattern of the sidelink data and/or air interface data of the first user equipment. For example, it is assumed that the first user equipment transmits air interface uplink data periodically, wherein the sending resource to be occupied by the air interface data is located in subframe 2, and the period is 20 milliseconds. Further, the first user equipment also transmits sidelink data periodically, wherein the sending resource to be occupied by the sidelink data is located in subframe 6, and the period is 10 milliseconds. Then, the first time domain resource positions where the sidelink control signaling and the sidelink data are unable to be received by the first user equipment are subframe 2 with a period of 20 milliseconds, and subframe 6 with a period of 10 milliseconds.

In the step 303, the first sidelink control signaling is sent to the second user equipment by using the first sending resource, wherein the first sidelink control signaling includes first indication information. The first indication information is used for indicating the first time domain resource position, for instructing the second user equipment not to send the sidelink control signaling and the sidelink data to the first user equipment at the first time domain resource position.

In some embodiments, the sidelink adopts a half-duplex working mode. That is, sending and receiving of the sidelink data and the sidelink control signaling cannot be executed at the same time. In addition, since the sidelink multiplexes an uplink resource of the air interface, sending and receiving of the sidelink cannot be executed at the same time with the uplink sending of the sidelink as well. After receiving the first sidelink control signaling, the second user equipment obtains the first time domain resource position. Then, the second user equipment does not send the sidelink control signaling and the sidelink data to the first user equipment at the first time domain resource position, thereby avoiding that the first user equipment cannot receive the sidelink control signaling and the sidelink data sent by the second user equipment.

Through the technical solution provided by embodiments of the present disclosure, the first time domain resource position where the first user equipment cannot receive the sidelink control signaling and the sidelink data is obtained, and the first indication information is included in the first sidelink control signaling sent to the second user equipment, in order to instruct the second user equipment not to send the sidelink control signaling and the sidelink data to the first user equipment at the first time domain resource position. Thereby, it is avoided that the first user equipment cannot receive the sidelink control signaling and the sidelink data sent by the second user equipment, effectively managing unicast connection, improving the performance of sidelink communication, and improving system reliability.

Figure 4:
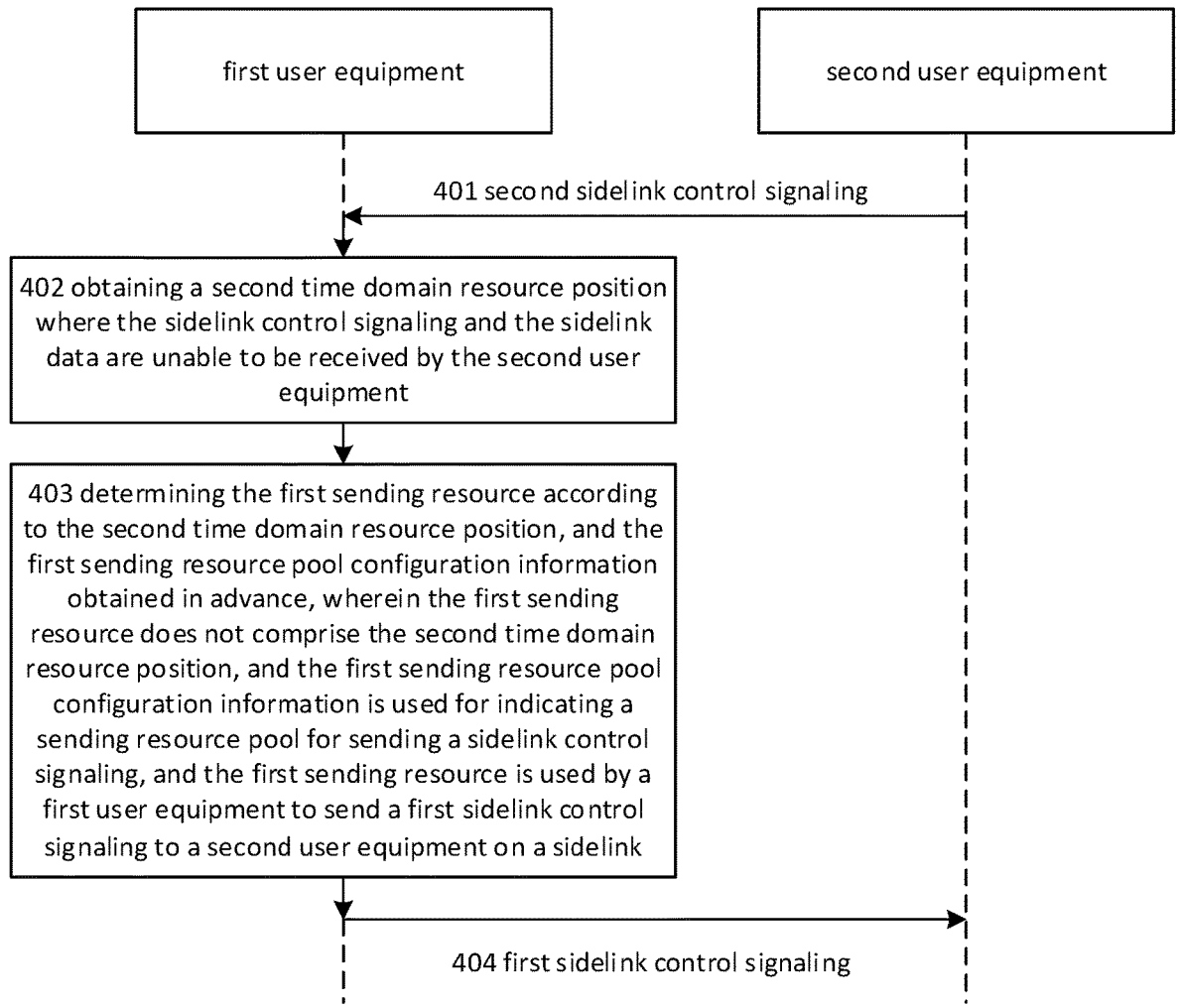
FIG. 4 is a flowchart showing a resource determination method according to an exemplary embodiment.

FIG. 4 is a flowchart showing a resource determination method according to an exemplary embodiment. The execution subject of the resource determination method in embodiments of the present disclosure may be the first user equipment and the second user equipment. As shown in FIG. 4, the method includes the following steps 401-404. For parts not described in detail in this embodiment, reference may be made to the corresponding description of the embodiment shown in FIG. 2.

In the step 401, the second user equipment sends second sidelink control signaling to the first user equipment, wherein the second sidelink control signaling includes second indication information, and the second indication information is used for indicating a second time domain resource position where the sidelink control signaling and the sidelink data are unable to be received by the second user equipment.

In some embodiments, the second sidelink control signaling may include any of the following signaling: a sidelink connection request, a sidelink connection establishment, a sidelink connection establishment completion, a sidelink reconfiguration, and a sidelink release. Optionally, the second sidelink control signaling may be a control signaling related to the first sidelink control signaling. For example, the second sidelink control signaling is the sidelink connection request, and the first sidelink control signaling is the sidelink connection establishment. Alternatively, the second sidelink control signaling may be a control signaling that is not related to the first sidelink control signaling, which is not limited in the present disclosure.

In the step 402, the first user equipment receives the second sidelink control signaling sent by the second user equipment, and obtains the second time domain resource position where the second user equipment cannot receive the sidelink control signaling and the sidelink data.

In the step 403, the first user equipment determines the first sending resource according to the second time domain resource position, and the first sending resource pool configuration information obtained in advance. The first sending resource does not include the second time domain resource position. The first sending resource pool configuration information is used for indicating the sending resource pool for sending the sidelink control signaling. The first sending resource is used by the first user equipment to send the first sidelink control signaling to the second user equipment on the sidelink.

In the step 404, the first user equipment uses the first sending resource to send the first sidelink control signaling to the second user equipment.

Through the technical solution provided by embodiments of the present disclosure, the second indication information is included in the second sidelink control signaling sent by the second user equipment to the first user equipments, so that the first user equipment knows the second time domain resource position where the second user equipment cannot receive the sidelink control signaling and the sidelink data. Thus, the first user equipment is prevented from sending the sidelink control signaling and the sidelink data at the second time domain resource position where the second user equipment cannot receive the sidelink control signaling and the sidelink data, thereby effectively managing unicast connection, improving the performance of sidelink communication, and improving system reliability.

The following are device embodiments of the present disclosure, which can be used to implement the method embodiments of the present disclosure. For parts of the device embodiments that are not described in detail, reference may be made to the method embodiments.

Figure 5:
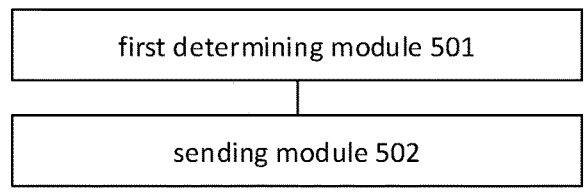
FIG. 5 is a block diagram showing a resource determination device according to an exemplary embodiment.

FIG. 5 is a block diagram showing a resource determination device according to an exemplary embodiment. The device may be applied to a first user equipment. Referring to FIG. 5, the resource determination device includes: a first determining module 501 and a sending module 502.

The first determining module 501 is configured to determine a first sending resource according to first sending resource pool configuration information obtained in advance. The first sending resource pool configuration information is used for indicating a sending resource pool for sending a sidelink control signaling, and the first sending resource is used by a first user equipment to send a first sidelink control signaling to a second user equipment on a sidelink.

The sending module 502 is configured to send the first sidelink control signaling to the second user equipment by using the first sending resource.

By using the technical solution provided by embodiments of the present disclosure, the first sending resource, for sending by the first user equipment the first sidelink control signaling to the second user equipment on the sidelink, is determined based on the first sending resource pool configuration information. The first sending resource pool configuration information is obtained in advance and used for indicating the sending resource pool for sending the sidelink control signaling. Thus, the sending resource is allocated for the sidelink control signaling, so that the UE may send the sidelink control signaling on the sidelink, thereby effectively managing unicast connection, improving the performance of sidelink communication, and improving system reliability.

Figure 6:
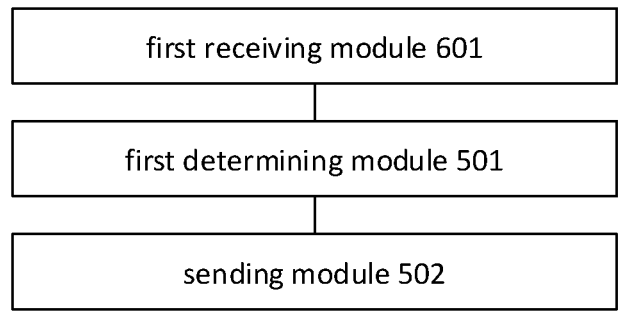
FIG. 6 is a block diagram showing a resource determination device according to an exemplary embodiment.

In an embodiment, as shown in FIG. 6, the resource determination device shown in FIG. 5 may further include: a first receiving module 601, configured to receive a broadcast message sent by a base station, the broadcast message including the first sending resource pool configuration information.

Figure 7:
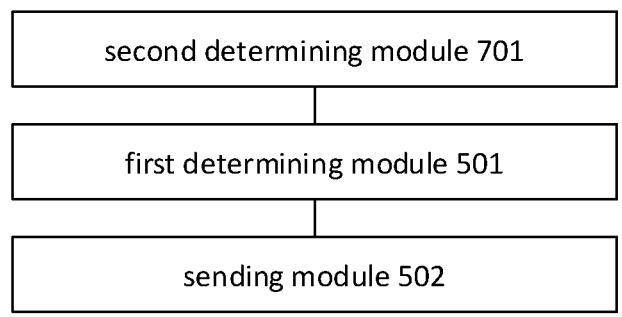
FIG. 7 is a block diagram showing a resource determination device according to an exemplary embodiment.

In an embodiment, as shown in FIG. 7, the resource determination device shown in FIG. 5 may further include: a second determining module 701, configured to determine the first sending resource pool configuration information according to second sending resource pool configuration information obtained in advance, wherein the second sending resource pool configuration information is used for indicating a sending resource pool for sending sidelink data.

In an embodiment, the second determining module 701 is configured to select the first sending resource from the sending resource pool for sending the sidelink data, according to quality of service (QoS) corresponding to the sending resource pool which is used for sending the sidelink data and indicated by the second sending resource pool configuration information.

Figure 8:
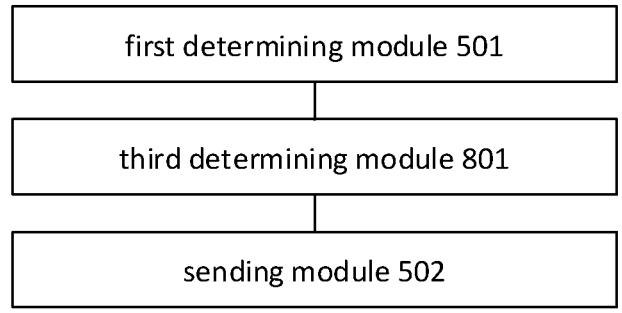
FIG. 8 is a block diagram showing a resource determination device according to an exemplary embodiment.

In an embodiment, as shown in FIG. 8, the resource determination device shown in FIG. 5 may further include: a third determining module 801, configured to determine a first time domain resource position where the sidelink control signaling and the sidelink data are unable to be received by the first user equipment, according to a sending resource which is to be occupied by the sidelink data and air interface data to be sent by the first user equipment. Accordingly, the first sidelink control signaling includes first indication information, wherein the first indication information is used for indicating the first time domain resource position, for instructing the second user equipment not to send the sidelink control signaling and the sidelink data to the first user equipment at the first time domain resource position.

Figure 9:
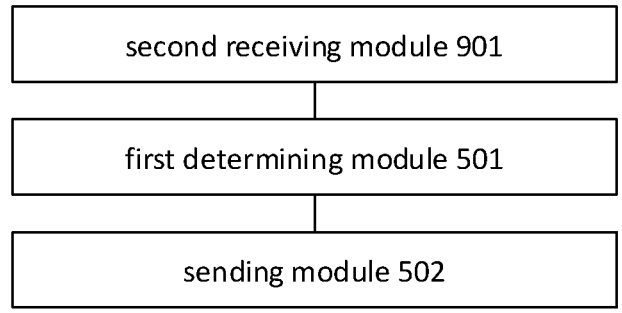
FIG. 9 is a block diagram showing a resource determination device according to an exemplary embodiment.

In an embodiment, as shown in FIG. 9, the resource determination device shown in FIG. 5 may further include: a second receiving module 901, configured to receive a second sidelink control signaling sent by the second user equipment. The second sidelink control signaling includes second indication information, wherein the second indication information is used for indicating a second time domain resource position where the sidelink control signaling and the sidelink data are unable to be received by the second user equipment.

Accordingly, the first determining module 501 is configured to determine the first sending resource according to the second time domain resource position, and the first sending resource pool configuration information obtained in advance, wherein the first sending resource does not include the second time domain resource position.

Figure 10:
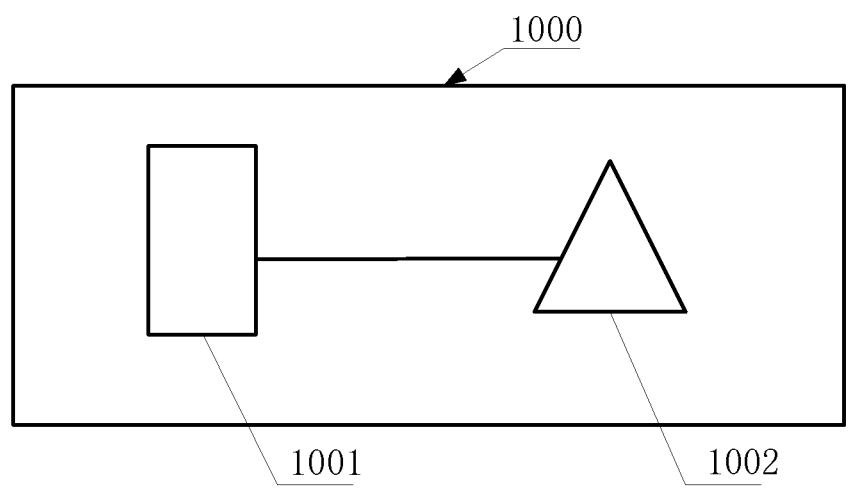
FIG. 10 is a block diagram showing a resource determination device according to an exemplary embodiment.

FIG. 10 is a block diagram showing a resource determination device 1000 according to an exemplary embodiment, which is applied to a first user equipment. The resource determination device 1000 includes:

a processor 1001; and a memory 1002 for storing executable instructions of the processor, wherein the processor 1001 is configured to:

determine a first sending resource according to first sending resource pool configuration information obtained in advance, wherein the first sending resource pool configuration information is used for indicating a sending resource pool for sending a sidelink control signaling, and the first sending resource is used by a first user equipment to send a first sidelink control signaling to a second user equipment on a sidelink; and send the first sidelink control signaling to the second user equipment by using the first sending resource.

In an embodiment, the processor 1001 may also be configured to:

receive a broadcast message which is sent by a base station and includes the first sending resource pool configuration information.

In an embodiment, the processor 1001 may also be configured to:

determine the first sending resource pool configuration information according to second sending resource pool configuration information obtained in advance, wherein the second sending resource pool configuration information is used for indicating a sending resource pool for sending sidelink data.

In an embodiment, the processor 1001 may also be configured to:

select the first sending resource from the sending resource pool for sending the sidelink data, according to quality of service (QoS) corresponding to the sending resource pool which is used for sending the sidelink data and indicated by the second sending resource pool configuration information.

In an embodiment, the processor 1001 may also be configured to:

determine a first time domain resource position where the sidelink control signaling and the sidelink data are unable to be received by the first user equipment, according to a sending resource which is to be occupied by the sidelink data and the air interface data to be sent by the first user equipment.

Accordingly, the first sidelink control signaling includes first indication information. The first indication information is used for indicating the first time domain resource position, for instructing the second user equipment not to send the sidelink control signaling and the sidelink data to the first user equipment at the first time domain resource position.

In an embodiment, the processor 1001 may also be configured to:

receive a second sidelink control signaling sent by the second user equipment, before determining the first sending resource according to the first sending resource pool configuration information obtained in advance, wherein the second sidelink control signaling includes second indication information, and the second indication information is used for indicating a second time domain resource position where the sidelink control signaling and the sidelink data are unable to be received by the second user equipment.

Accordingly, the first sending resource is determined according to the second time domain resource position, and the first sending resource pool configuration information obtained in advance, wherein the first sending resource does not include the second time domain resource position.

In an embodiment, the first sidelink control signaling includes any of the following signaling: a sidelink connection request, a sidelink connection establishment, a sidelink connection establishment completion, a sidelink reconfiguration, and a sidelink release.

Regarding the device in the foregoing embodiments, a specific manner in which each module performs operations has been described in detail in the method embodiments, and detailed description will not be given here.

Figure 11:
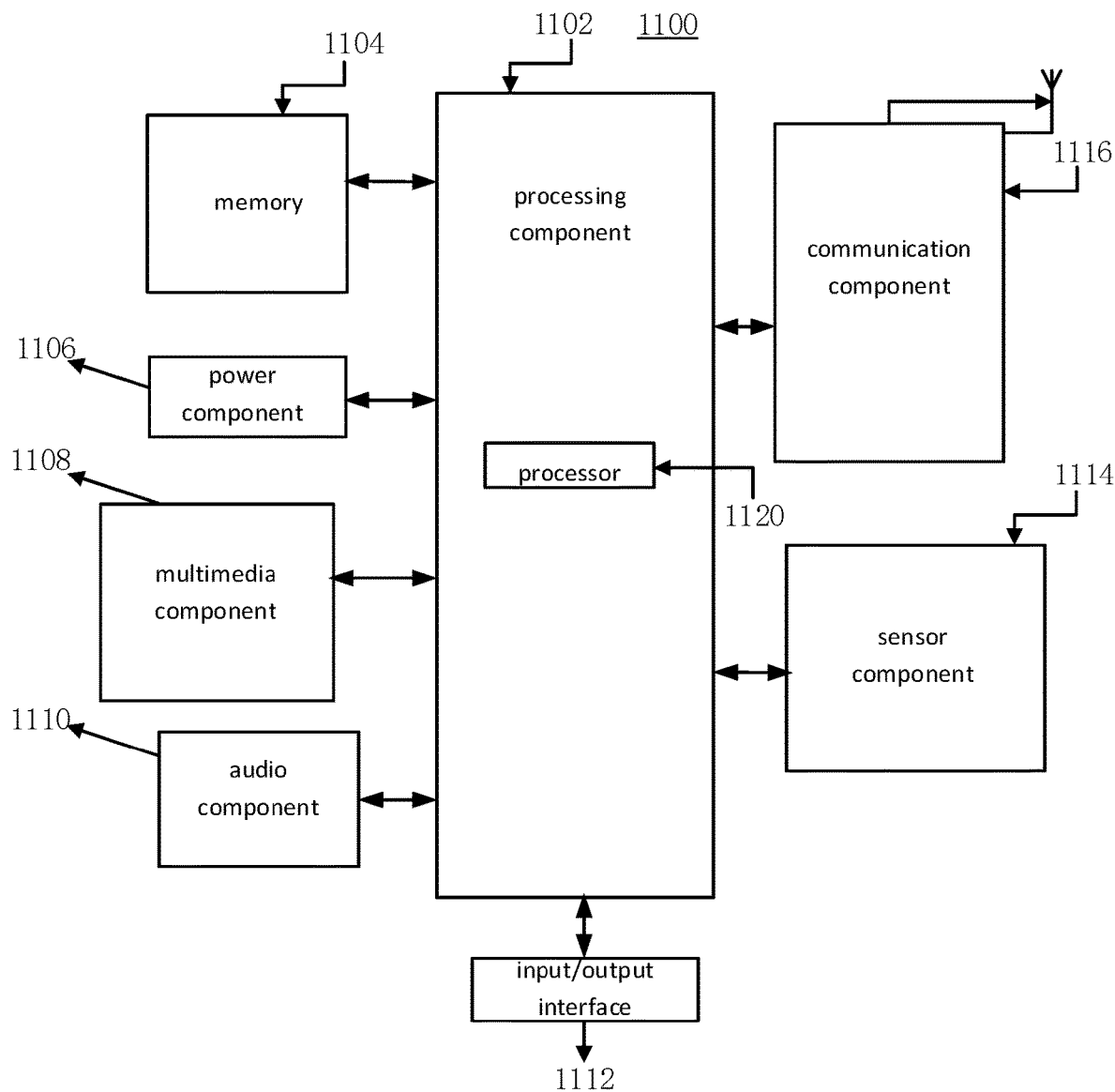
FIG. 11 is a block diagram showing a resource determination device according to an exemplary embodiment.

FIG. 11 is a block diagram showing a resource determination device according to an exemplary embodiment. The resource determination device 1100 is suitable for a first user equipment supporting the sidelink communication. The resource determination device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls the overall operation of the resource determination device 1100, such as operations associated with display, telephone calls, data communication, camera operation, and recording operation. The processing component 1102 can include one or more processors 1120 to execute instructions, so as to perform all or part of the steps in the above-described methods. Moreover, the processing component 1102 can include one or more modules to facilitate the interaction between the processing component 1102 and other components. For example, the processing component 1102 can include a multimedia module to facilitate the interaction between the multimedia component 1108 and the processing component 1102.

The memory 1104 is configured to store various types of data to support the operation of the resource determination device 1100. Examples of such data include instructions for any application or method operated on the resource determination device 1100, contact data, phone book data, messages, pictures, videos, and the like. The memory 1104 can be implemented by any type of volatile or non-volatile storage device, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the resource determination device 1100. The power component 1106 can include a power management system, one or more power sources, and other components associated with generation, management, and distribution of power in the resource determination device 1100.

The multimedia component 1108 includes a screen providing an output interface between the resource determination device 1100 and the user. In some embodiments, the screen can include a liquid crystal display (LCD) and a touch panel (TP). If the screen includes the touch panel, the screen can be implemented as a touch screen, so as to receive input signals from the user. The touch panel includes one or more touch sensors to sense touches, swipes, and gestures on the touch panel. The touch sensors may not only sense a boundary of a touch or swipe operation, but also sense a period of time and a pressure associated with the touch or swipe operation. In some embodiments, the multimedia component 1108 includes a front camera and/or a rear camera. When the resource determination device 1100 is in an operation mode, such as a photographing mode or a video mode, the front camera and/or the rear camera can receive external multimedia data. Each of the front camera and the rear camera may be a fixed optical lens system or have the capability of focusing and optical zooming.

The audio component 1110 is configured to output and/or input an audio signal. For example, the audio component 1110 includes a microphone (MIC), configured to receive an external audio signal when the resource determination device 1100 is in an operation mode, such as a call mode, a recording mode, and a voice recognition mode. The received audio signal may be further stored in the memory 1104, or sent via the communication component 1116. In some embodiments, the audio component 1110 also includes a speaker for outputting the audio signal.

The I/O interface 1112 provides an interface between the processing component 1102 and peripheral interface modules, such as a keyboard, a click wheel, buttons, and the like. These buttons may include, but are not limited to, a home button, a volume button, a starting button, and a locking button.

The sensor component 1114 includes one or more sensors for providing status assessments of various aspects of the resource determination device 1100. For example, the sensor component 1114 can detect an open/closed status of the resource determination device 1100, relative positioning between components (such as the display and the keypad of the resource determination device 1100). The sensor component 1114 can also detect a change in position of a component of the resource determination device 1100 or the resource determination device 1100, presence or absence of user contact with the resource determination device 1100, orientation or acceleration/deceleration of the resource determination device 1100, and a change in temperature of the resource determination device 1100. The sensor component 1114 can include a proximity sensor, configured to detect the presence of nearby objects without any physical contact. The sensor component 1114 can also include a light sensor, such as a CMOS or CCD image sensor, configured to be use in imaging applications. In some embodiments, the sensor component 1114 can also include an accelerometer sensor, a gyroscope sensor, a magnetic sensor, a pressure sensor, or a temperature sensor.

The communication component 1116 is configured to facilitate wired or wireless communication between the resource determination device 1100 and other devices. The resource determination device 1100 can access a wireless network based on a communication standard, such as Wi-Fi, 2G/3G/4G/5G, or a combination thereof. In an exemplary embodiment, the communication component 1116 receives broadcast signals or broadcast related information from an external broadcast management system via a broadcast channel. In an exemplary embodiment, the communication component 1116 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the resource determination device 1100 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, and is configured to perform the above methods.

In an exemplary embodiment, there is also provided a non-transitory computer-readable storage medium including instructions, such as a memory 1104 including instructions, executable by the processor 1120 of the resource determination device 1100 to perform the above-described methods. For example, the non-transitory computer readable storage medium may be a ROM, a random-access memory (RAM), a CD-ROM, a magnetic tape, a floppy disc, and an optical data storage device.

Instructions in the storage medium, when executed by a processor, cause the resource determination device 1100 to execute the following method, which includes:

determining a first sending resource according to first sending resource pool configuration information obtained in advance, wherein the first sending resource pool configuration information is used for indicating a sending resource pool for sending a sidelink control signaling, and the first sending resource is used by a first user equipment to send a first sidelink control signaling to a second user equipment on a sidelink; and sending the first sidelink control signaling to the second user equipment by using the first sending resource.

In an embodiment, the method further includes:

receiving a broadcast message which is sent by a base station and includes the first sending resource pool configuration information.

In an embodiment, the method further includes:

determining the first sending resource pool configuration information according to second sending resource pool configuration information obtained in advance, wherein the second sending resource pool configuration information is used for indicating a sending resource pool for sending sidelink data.

In an embodiment, the determining the first sending resource pool configuration information according to the second sending resource pool configuration information obtained in advance, includes:

selecting the first sending resource from the sending resource pool for sending the sidelink data, according to quality of service (QoS) corresponding to the sending resource pool which is used for sending the sidelink data and indicated by the second sending resource pool configuration information.

In an embodiment, the method further includes:

determining a first time domain resource position where the sidelink control signaling and the sidelink data are unable to be received by the first user equipment, according to a sending resource which is to be occupied by the sidelink data and the air interface data to be sent by the first user equipment.

Accordingly, the first sidelink control signaling includes first indication information, wherein the first indication information is used for indicating the first time domain resource position, for instructing the second user equipment not to send the sidelink control signaling and the sidelink data to the first user equipment at the first time domain resource position.

In an embodiment, before determining the first sending resource according to the first sending resource pool configuration information obtained in advance, the method further includes:

receiving a second sidelink control signaling sent by the second user equipment, wherein the second sidelink control signaling includes second indication information, and the second indication information is used for indicating a second time domain resource position where the sidelink control signaling and the sidelink data are unable to be received by the second user equipment.

Accordingly, the determining the first sending resource according to the first sending resource pool configuration information obtained in advance, includes:

determining the first sending resource according to the second time domain resource position, and the first sending resource pool configuration information obtained in advance, wherein the first sending resource does not include the second time domain resource position.

In an embodiment, the first sidelink control signaling includes any of the following signaling:

a sidelink connection request, a sidelink connection establishment, a sidelink connection establishment completion, a sidelink reconfiguration, and a sidelink release.

Figure 12:
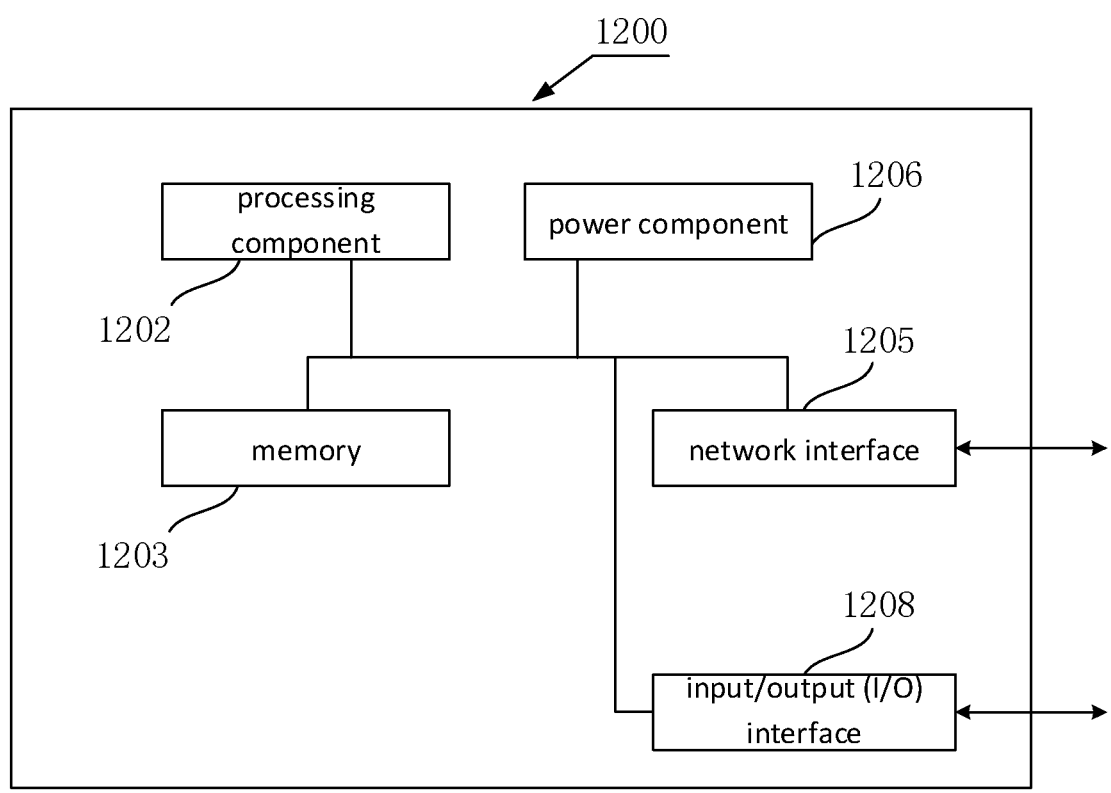
FIG. 12 is a block diagram showing a resource determination device according to an exemplary embodiment.

FIG. 12 is a block diagram showing a resource determination device according to an exemplary embodiment. For example, the resource determination device 1200 may be provided as a server. The resource determination device 1200 includes a processing component 1202, which further includes one or more processors, and a memory resource represented by a memory 1203 for storing instructions (such as an application program) executable by the processing component 1202. The application program stored in the memory 1203 may include one or more modules, each corresponding to a set of instructions. In addition, the processing component 1202 is configured to execute instructions to perform the above methods.

The resource determination device 1200 may also include: a power component 1206, configured to perform power management of the resource determination device 100; a wired or wireless network interface 1205, configured to connect the resource determination device 1200 to a network; and an input/output (I/O) interface 1208. The resource determination device 1200 can operate based on an operating system stored in the memory 1203, such as Windows Server™, Mac OS X™, Unix™, Linux™, FreeBSD™ or the like.

There is provided a non-transitory computer-readable storage medium.

Instructions in the storage medium, when executed by a processor of the resource determination device 1200, cause the resource determination device 1200 to execute the following resource determination method, which includes:

determining a first sending resource according to first sending resource pool configuration information obtained in advance, wherein the first sending resource pool configuration information is used for indicating a sending resource pool for sending a sidelink control signaling, and the first sending resource is used by a first user equipment to send a first sidelink control signaling to a second user equipment on a sidelink; and sending the first sidelink control signaling to the second user equipment by using the first sending resource.

In an embodiment, the method further includes:

receiving a broadcast message which is sent by a base station and includes the first sending resource pool configuration information.

In an embodiment, the method further includes:

determining the first sending resource pool configuration information according to second sending resource pool configuration information obtained in advance, wherein the second sending resource pool configuration information is used for indicating a sending resource pool for sending sidelink data.

In an embodiment, the determining the first sending resource pool configuration information, according to the second sending resource pool configuration information obtained in advance, includes:

selecting the first sending resource from the sending resource pool for sending the sidelink data, according to quality of service (QoS) corresponding to the sending resource pool which is used for sending the sidelink data and indicated by the second sending resource pool configuration information.

In an embodiment, the method further includes:

determining a first time domain resource position where the sidelink control signaling and the sidelink data are unable to be received by the first user equipment, according to a sending resource which is to be occupied by the sidelink data and the air interface data to be sent by the first user equipment.

Accordingly, the first sidelink control signaling includes first indication information. The first indication information is used for indicating the first time domain resource position, for instructing the second user equipment not to send the sidelink control signaling and the sidelink data to the first user equipment at the first time domain resource position.

In an embodiment, before determining the first sending resource according to the first sending resource pool configuration information obtained in advance, the method further includes:

receiving a second sidelink control signaling sent by the second user equipment, wherein the second sidelink control signaling includes second indication information, and the second indication information is used for indicating a second time domain resource position where the sidelink control signaling and the sidelink data are unable to be received by the second user equipment.

Accordingly, the determining the first sending resource according to the first sending resource pool configuration information obtained in advance includes:

determining the first sending resource according to the second time domain resource position, and the first sending resource pool configuration information obtained in advance, wherein the first sending resource does not include the second time domain resource position.

In an embodiment, the first sidelink control signaling includes any of the following signaling:

a sidelink connection request, a sidelink connection establishment, a sidelink connection establishment completion, a sidelink reconfiguration, and a sidelink release.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A resource determination method, comprising:

determining a first sending resource according to first sending resource pool configuration information obtained in advance, wherein the first sending resource pool configuration information is configured for indicating a first sending resource pool for sending a first sidelink control signaling, and the first sending resource is employed by a first user equipment to send the first sidelink control signaling to a second user equipment on a sidelink;

sending the first sidelink control signaling to the second user equipment with the first sending resource;

determining a first time domain resource position where the first user equipment is unable to receive sidelink control signaling and sidelink data, according to a sending resource which is to be occupied by the first sidelink data and air interface data to be sent by the first user equipment; and accordingly, the first sidelink control signaling comprises first indication information, wherein the first indication information is configured for indicating the first time domain resource position, for instructing the second user equipment not to send the sidelink control signaling and the sidelink data to the first user equipment at the first time domain resource position, wherein the method further comprises: prior to the determining the first sending resource according to the first sending resource pool configuration information obtained in advance, receiving a second sidelink control signaling sent by the second user equipment, wherein the second sidelink control signaling comprises second indication information, and the second indication information is configured for indicating a second time domain resource position where the sidelink control signaling and the sidelink data are unable to be received by the second user equipment; and accordingly, the determining the first sending resource, according to the first sending resource pool configuration information obtained in advance, comprises:

determining the first sending resource according to the second time domain resource position, and the first sending resource pool configuration information obtained in advance, wherein the first sending resource does not comprise the second time domain resource position.

2. The method according to claim 1, further comprising: receiving a broadcast message which is sent by a base station and comprises the first sending resource pool configuration information.

3. The method according to claim 1, further comprising: determining the first sending resource pool configuration information according to second sending resource pool configuration information obtained in advance, wherein the second sending resource pool configuration information is configured for indicating a second sending resource pool for sending sidelink data.

4. The method according to claim 3, wherein the determining the first sending resource pool configuration information, according to the second sending resource pool configuration information obtained in advance, comprises:

selecting the first sending resource pool from the second sending resource pool, according to quality of service (QOS) corresponding to the second sending resource pool indicated by the second sending resource pool configuration information; and selecting the first sending resource from the first sending resource pool.

5. The method according to claim 1, wherein the first sidelink control signaling comprises any of the following signaling:

a sidelink connection request, a sidelink connection establishment, a sidelink connection establishment completion, a sidelink reconfiguration, and a sidelink release.

6. A non-transitory computer-readable storage medium, having at least one instruction stored thereon, wherein the instruction is loaded and executed by a processor to implement operations executed in the method according to claim 1.

7. The non-transitory computer-readable storage medium according to claim 6, wherein the sending resource is allocated for the first sidelink control signaling such that the first user equipment is capable of sending the first sidelink control signaling on the sidelink, thereby effectively managing unicast connection and improving performance of sidelink communication and system reliability.

8. A communication system implementing the method according to claim 1, wherein the sending resource is allocated for the first sidelink control signaling such that the first user equipment is capable of sending the first sidelink control signaling on the sidelink, thereby effectively managing unicast connection and improving performance of sidelink communication and system reliability.

9. The communication system according to claim 8, comprising a base station configured to send a broadcast message comprising the first sending resource pool configuration information.

10. The communication system according to claim 9, further comprising the first user equipment and the second user equipment.

11. The communication system according to claim 10, wherein the communication system comprises a 5G system.

12. A resource determination device, comprising:

a first determining module, configured to determine a first sending resource according to first sending resource pool configuration information obtained in advance, wherein the first sending resource pool configuration information is configured for indicating a first sending resource pool for sending a first sidelink control signaling, and the first sending resource is employed by a first user equipment to send the first sidelink control signaling to a second user equipment on a sidelink;

a sending module, configured to send the first sidelink control signaling to the second user equipment with the first sending resource;

a third determining module, configured to determine a first time domain resource position where the first user equipment is unable to receive sidelink control signaling and sidelink data, according to a sending resource which is to be occupied by the first sidelink data and air interface data to be sent by the first user equipment, and accordingly, the first sidelink control signaling comprises first indication information, wherein the first indication information is configured for indicating the first time domain resource position, for instructing the second user equipment not to send the sidelink control signaling and the sidelink data to the first user equipment at the first time domain resource position, wherein the device further comprises:

a second receiving module, configured to receive the second sidelink control signaling sent by the second user equipment, wherein the second sidelink control signaling comprises second indication information, and the second indication information is configured for indicating a second time domain resource position where the sidelink control signaling and the sidelink data are unable to be received by the second user equipment; and accordingly, the first determining module is configured to determine the first sending resource according to the second time domain resource position, and the first sending resource pool configuration information obtained in advance, wherein the first sending resource does not comprise the second time domain resource position.

13. The device according to claim 12, further comprising:

a first receiving module, configured to receive a broadcast message which is sent by a base station and comprises the first sending resource pool configuration information.

14. The device according to claim 12, further comprising:
a second determining module, configured to determine the first sending resource pool configuration information according to second sending resource pool configuration information obtained in advance, wherein the second sending resource pool configuration information is configured for indicating a second sending resource pool for sending sidelink data.

15. The device according to claim 14, wherein the second determining module is configured to:
select the first sending resource pool from the second sending resource pool, according to quality of service (QOS) corresponding to the second sending resource pool indicated by the second sending resource pool configuration information; and
select the first sending resource from the first sending resource pool.

16. A resource determination device, comprising:
a processor; and
a memory for storing executable instructions of the processor, wherein the processor is configured to:
determine a first sending resource according to first sending resource pool configuration information obtained in advance, wherein the first sending resource pool configuration information is configured for indicating a first sending resource pool for sending a first sidelink control signaling, and the first sending resource is employed by a first user equipment to send the first sidelink control signaling to a second user equipment on a sidelink;
send the first sidelink control signaling to the second user equipment with the first sending resource;
determine a first time domain resource position where the first user equipment is unable to receive sidelink control signaling and sidelink data, according to a sending resource which is to be occupied by the first sidelink data and air interface data to be sent by the first user equipment; and
accordingly, the first sidelink control signaling comprises first indication information, wherein the first indication information is configured for indicating the first time domain resource position, for instructing the second user equipment not to send the sidelink control signaling and the sidelink data to the first user equipment at the first time domain resource position,
wherein the processor is further configured to:
receive the second sidelink control signaling sent by the second user equipment, wherein the second sidelink control signaling comprises second indication information, and the second indication information is configured for indicating a second time domain resource position where the sidelink control signaling and the sidelink data are unable to be received by the second user equipment; and
accordingly, determine the first sending resource according to the second time domain resource position, and the first sending resource pool configuration information obtained in advance, wherein the first sending resource does not comprise the second time domain resource position.

* * * * *